Jan. 27, 1970 T. J. DANFORD 3,491,521
FRUIT PICKER APPARATUS
Filed Jan. 30, 1968 4 Sheets-Sheet 1

Jan. 27, 1970     T. J. DANFORD     3,491,521
FRUIT PICKER APPARATUS
Filed Jan. 30, 1968     4 Sheets-Sheet 3
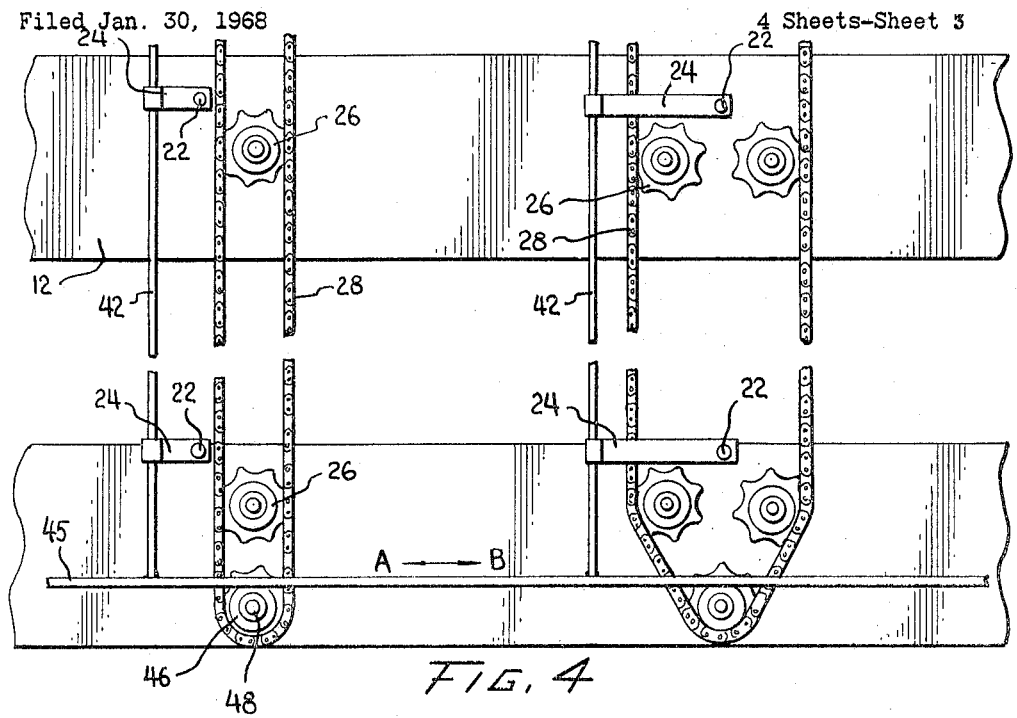
FIG. 4
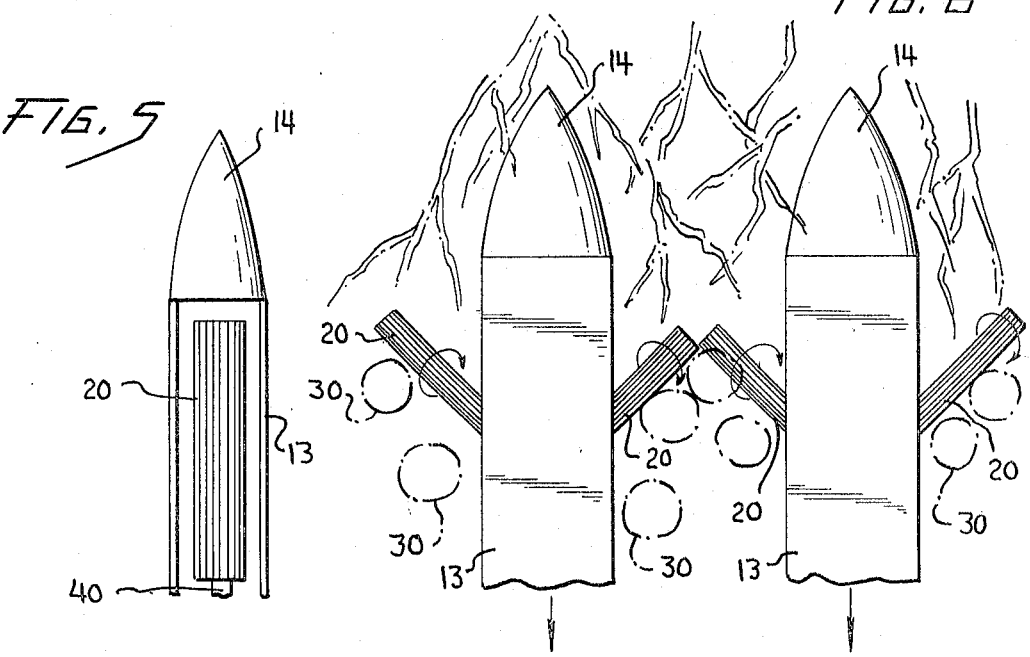
FIG. 5
FIG. 6

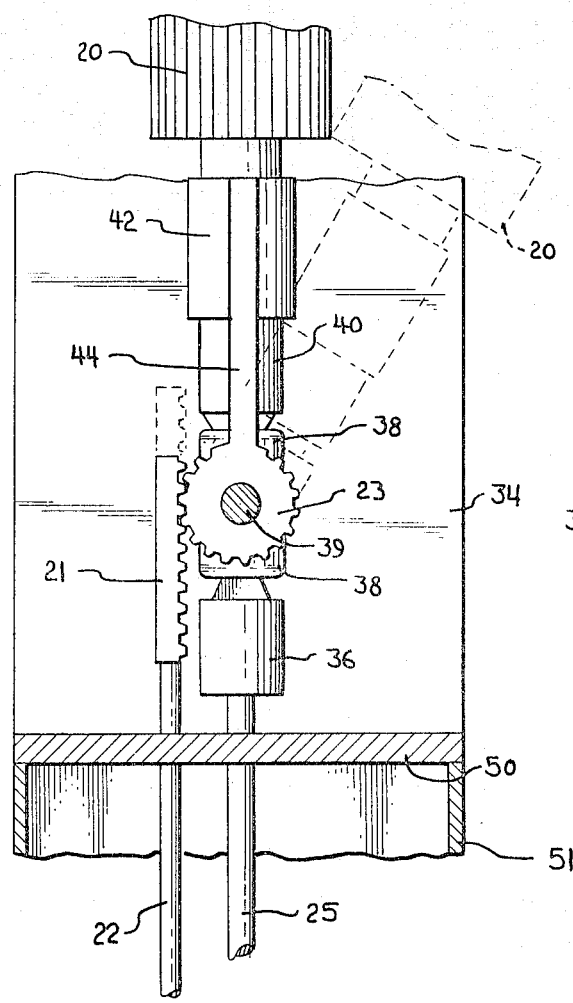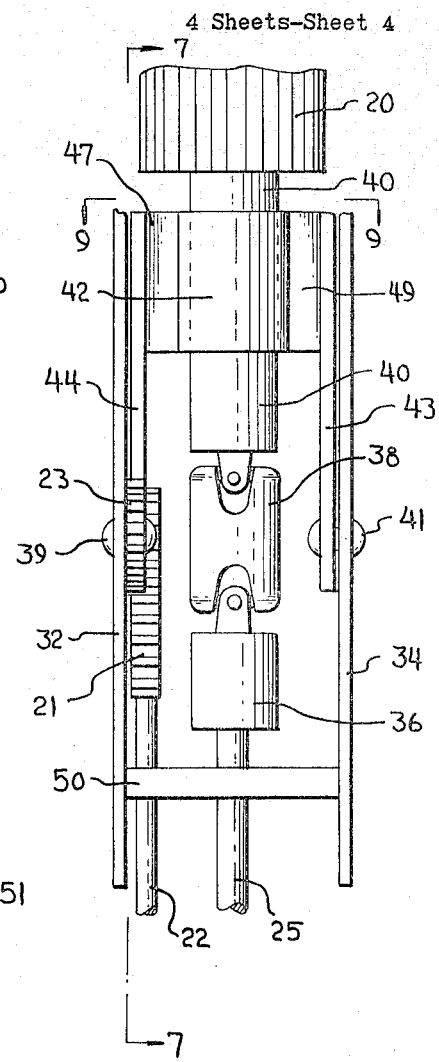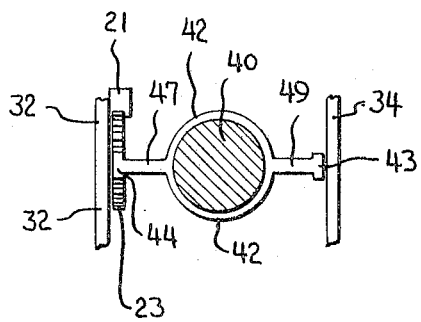

United States Patent Office 3,491,521
Patented Jan. 27, 1970

3,491,521
FRUIT PICKER APPARATUS
Tiras J. Danford, Rte. 2, Box 91,
Leesburg, Ga. 31763
Filed Jan. 30, 1968, Ser. No. 701,781
Int. Cl. A01g 19/06
U.S. Cl. 56—328                                    7 Claims

ABSTRACT OF THE DISCLOSURE

The present invention relates to a fruit picking apparatus comprising a framework supporting a plurality of elongated tubular foliage penetrating members which house laterally extendable rotable fruit contacting members.

BACKGROUND

The increasing cost and diminishing supply of manual labor have caused orchard owners and agricultural machinery manufacturers to devote a considerable amount of thought to the use of machines to facilitate the harvesting of fruit. The following patents are representative of some of the thought that has gone into fruit harvesters: 2,925,687, 3,040,507, 3,077,720, 3,084,967, 3,127,725, 3,129,551, 3,143,844, 3,164,942, 3,197,952, 3,200,575, 2,535,542, 3,210,921.

All of the harvesters disclosed in the above patents have limitations which need not be set forth here. It is believed that the present invention is free of such limitations and has advantages thereover.

THE PRESENT INVENTION

Considered from one aspect, the present invention relates to a fruit picking device comprising:

(a) a framework that is disposed in a generally vertical plane,
(b) a plurality of elongated and generally tubular foliage penetrating members mounted on said framework,
(c) each of said elongated tubular foliage penetrating members housing at least one rotatable fruit contacting member,
(d) each fruit contacting member being mounted so that it can be moved from a first position that is generally parallel to the longitudinal axis of the penetrating member to a second position that is at least partially outside of the housing of the foliage penetrating member and which is at an angle to the longitudinal axis of the housing of the foliage penetrating member,
(e) a first means for rotating each fruit contacting member, and,
(f) a second means for moving each fruit contacting member back and forth between said first and second positions.

BRIEF DESCRIPTION OF THE DRAWINGS

FIGURE 4 is an enlarged fragmentary view of some of the drive mechanisms and linkage arrangements used in connection with the fruit contacting members used in accordance with this invention;
FIGURE 5 is a view along 5—5 of FIGURE 3;
FIGURE 6 is a fragmentary plan view of my fruit harvester showing two of the foliage penetrating members with their fruit contacting members extended.

FIGURE 7 is an enlarged fragmentary view along 7—7 of FIGURE 8 (i.e. with member 32 removed).
FIGURE 8 is an enlarged fragmentary side view of a foliage penetrating member showing the details of the mechanical arrangement for both driving and turning a fruit contacting member.
FIGURE 9 is a fragmentary view, partly in section, taken along 9—9 of FIGURE 8.

DESCRIPTION OF PRFERRED EMBODIMENT

Figure 1:
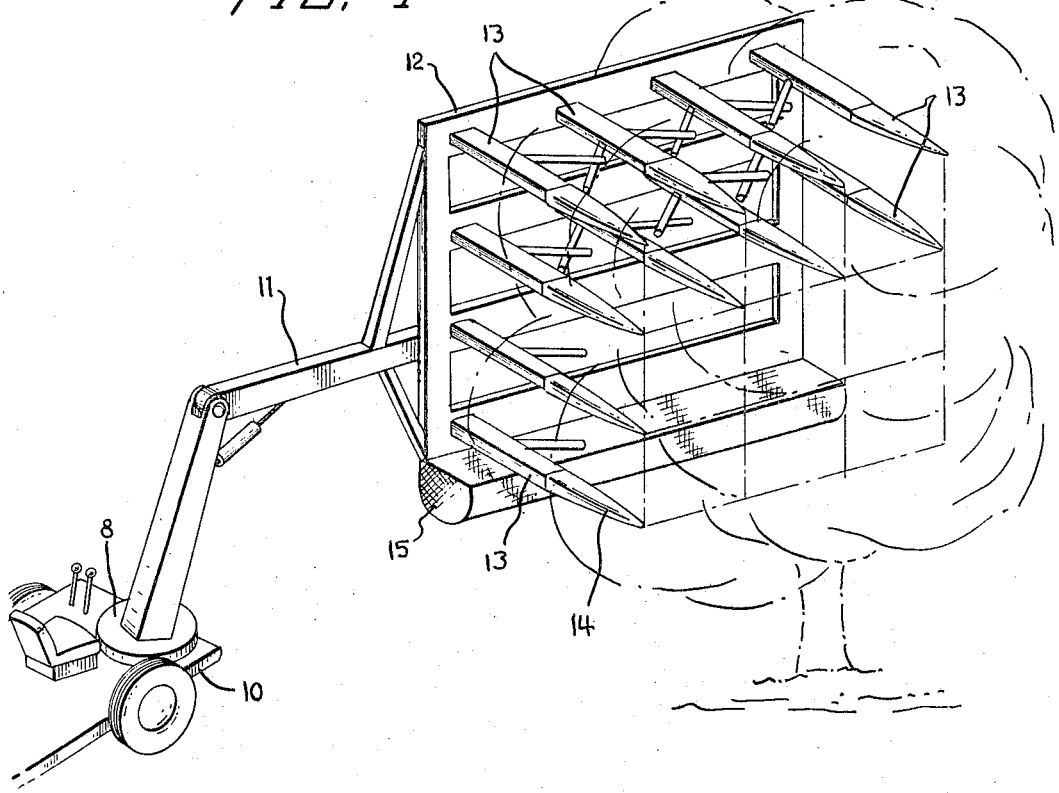
FIGURE 1 is a perspective view of my fruit picker.

Referring now to the drawings, and particularly to FIGURE 1, there is shown a mobile platform 10 having a boom member 11 mounted thereon. On the outer end of the boom a vertically disposed framework 12 is attached. The boom 11 is designed so that it can move the framework 12 in any desired direction and to hold it in any desired position with respect to a tree. In particular, the boom 11 must be constructed and mounted on the platform 10 so that it can at least move the framework 12 through a horizontal arc and so that the framework can move (a) from a first position spaced away from a tree, (b) to a second position close to or abutting the outer foliage of a tree, and (c) then progressively outwardly again toward the first position. The boom can be constructed so that it can also move the platform in any other desired direction, such as in a horizontal plane, perpendicular to the axis of a tree, etc. One means of accomplishing this would be to employ a turntable 8, the exact details of construction of such a boom and turntable are not shown since booms of this type are well known in the agricultural machinery art. Of course, mechanical arrangements which would be equivalent to a turntable could be used.

The framework 12 supports a plurality of what can probably be best described as elongated and generally tubular foliage penetrating members 13. For simplicity and clarity of illustration the framework is shown as supporting four spaced apart vertical rows of foliage penetrating members, with four vertically aligned foliage penetrating members in each row. However, it is to be understood that any number of rows may be used and each row may have as many foliage penetrating members in it as desired. Moreover, foliage penetrating members in adjacent vertical rows may be at the same height above the ground or they may be vertically staggered with respect to each other, if desired. In one preferred embodiment of the invention there would be four rows spaced about 18 inches apart, and sixteen vertically aligned foliage penetrating members in each row, each spaced about two inches apart.

Is is shown in the drawings, the outer end 14 of each foliage penetrating member prefereably has a generally pointed or streamlined configuration in order to facilitate penetration of the members 13 through the foliage of the tree and toward the interior of the tree.

Adjacent the lower portion of the framework 12 is mounted some sort of a collecting device for receiving and/or channeling to a certain location the fruit that is dislodged from the tree. The exact size, shape and location of such a device is not critical and may be varied widely. The type of receiving bin 15 shown in FIGURES 1 and 2 would be quite satisfactory under most conditions.

Figure 3:
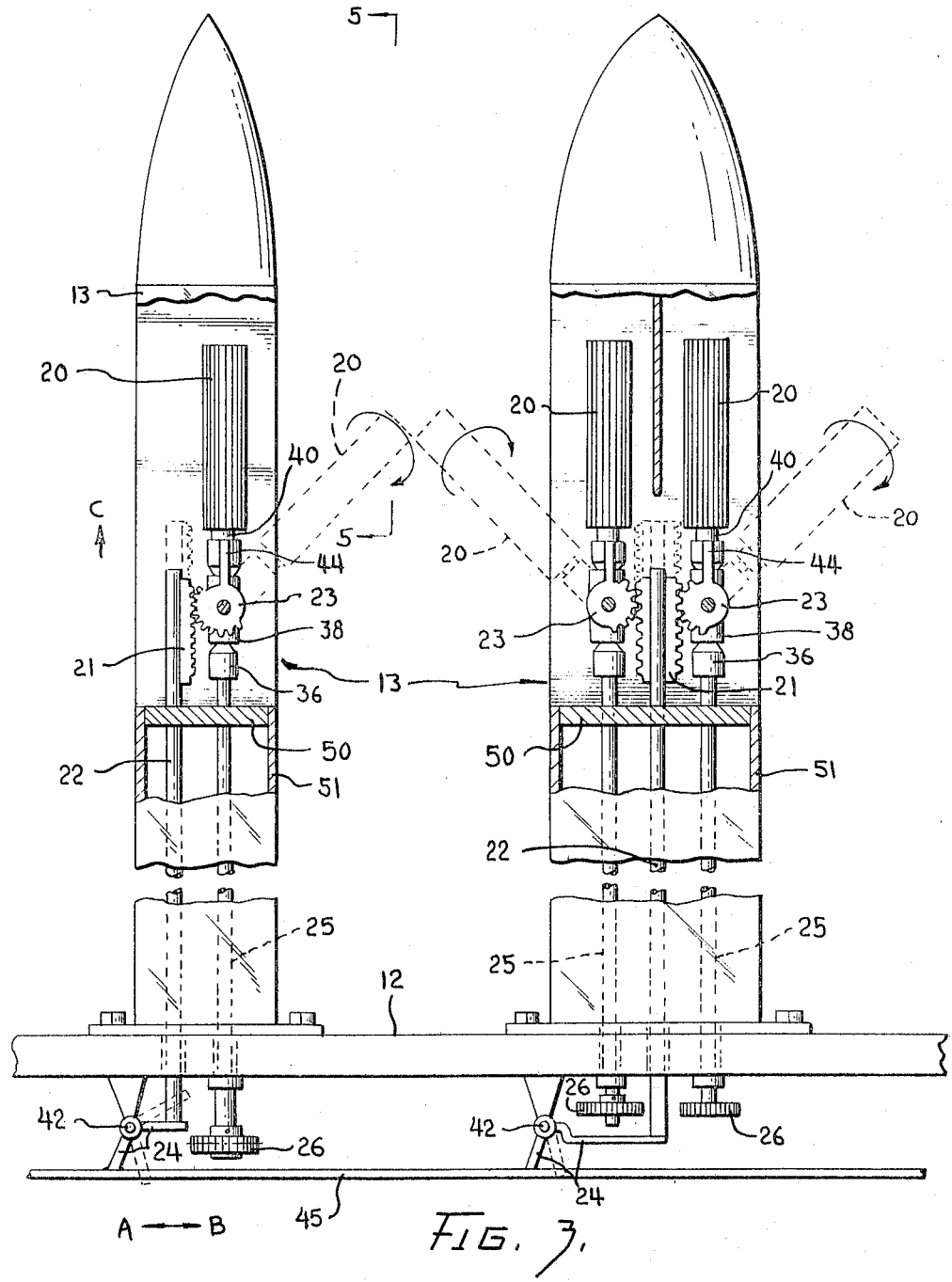
FIGURE 3 is an enlarged fragmentary plan view, partly in section, of two of the foliage penetrating members shown in FIGURE 1.

FIGURE 3 shows further details of the construction of elongated tubular foliage penetrating members. The foliage penetrating member shown on the right would be the same as those in the middle two rows in FIGURE 1, while the foliage penetrating member shown on the left in FIGURE 3 would correspond to one of those in the right-most row shown in FIGURE 1.

It is seen that each foliage penetrating member houses either one or two rotatable fruit contacting members 20. These fruit contacting members are adapted to be moved from a first position that is generally parallel to the longitudinal axis of the foliage penetrating member 13 to a second position that is outside of the housing of the foliage penetrating member and at an angle to the longitudinal axis of the housing of the foliage penetrating member. Said first position is shown by the solid lines for members 20 in FIGURE 3 and the second position is shown by the dotted lines for members 20 shown in FIGURE 3 and by the solid lines for members 20 shown in FIGURE 6.

Any suitable mechanical arrangement can be utilized for moving said fruit contacting members 20 from the first position to the second position. In the drawings a simple rack and pinion arrangement has been shown for carrying out this movement. With particular reference to FIGURES 3 and 7–9 the inner end of each fruit contacting member 20 is shown as being joined to and mounted upon a shaft 40 that passes through a pivotable bearing 42 (preferably made of nylon). The bearing 42 is mounted between the outer ends two pivot bars 44 and 43 by means of metal sections 47 and 49, and the inner ends of pivot bars 43 and 44 are joined to the upper side 32 of foliage penetrating member 13 by means of pivot 39 and to the underside 34 of foliage penetrating member 13 by means of pivot pin 41. The inner end of the upper pivot bar 44 is shown as being provided with a spur gear section 23 that is adapted to be engaged with rack gear 21 located on the end of shaft 22. Longitudinal movement of the shaft 22 (to the position shown by dotted lines) thus causes the pivot bar and bearing assembly to pivot, and since the shaft 40 is connected by a universal joint 38 (or an equivalent flexible driving means) to another drive shaft arrangement 36–25, the shaft 40 and the fruit contacting member 20 will also pivot.

Figure 2:
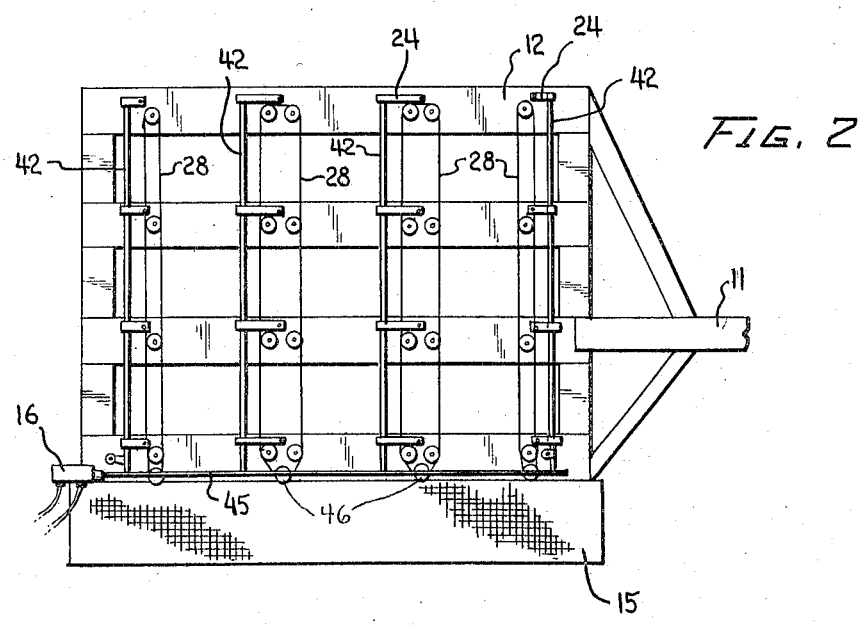
FIGURE 2 is a rear view of the framework of the picker shown in FIGURE 1.

FIGURES 2, 3 and 4 show how the shafts 22 extend through the main frame 12 and are connected to one end of pivotable L-shaped lever arms 24 that are preferably vertically aligned and journalled to vertical shafts 42. The lower ends of vertical shafts 42 are connected together by means of connector shaft 45 which is mounted so that it can be moved in directions A and B (see FIGURES 3 and 4) by a hydraulically actuated piston 16 or the like. Moving shaft 45 in direction B causes the fruit contacting members to extend outwardly so as to close the space between adjacent foliage penetrating members (see FIGURE 6), while movement in direction A causes them to retract to the position shown by the solid lines in FIGURE 3.

As is obvious from the foregoing, each fruit contacting member 20 is constructed so that it can be rotated around its axis and is operatively connected to means for rotating it. Referring to FIGURES 3, 5, 7 and 8 it will be seen that the inner end of each fruit contacting means 20 is connected to a shaft 40, that is in turn connected to a universal joint (or an equivalent flexible driving means) 38 and then to a drive shaft 36–25. The inner ends of drive shafts 25 are provided with sprockets 26 that are shown in FIGURES 2 and 4 as being driven by chains 28, which in turn, are driven by a driver sprockets 46. Driver sprockets 46 are mounted on the drive shafts of any suitable driving motor (not shown), and these drive shafts may be driven separately or in unison, and are controlled by the operator. It is preferable that the fruit contacting members 20 only rotate when they are in their "extended" position (shown in FIGURE 6) and the fruit contacting members can rotate as indicated by the arrows in FIGURE 6, or the direction of rotation of one or both of the fruit contacting members can be reversed from that shown in FIGURE 6.

In operation, the mobile vehicle 10 and boom 11 are operated so that the framework 12 is positioned in a plane that is parallel to the tangent of a tree. The framework is then gradually moved toward the center of the tree so that the plurality of elongated tubular members 13 penetrate inwardly through the leaves and branches as far as desired. During this penetration the fruit contacting members 20 are in the "retracted" position shown in FIGURE 3. Once the desired extent of penetration has been made, the operator actuates piston 16, which moves shaft 44 in direction B and lever 24 in a counter-clockwise direction. This in turn causes shaft 22 and rack 21 to move in the direction of "C" (see FIGURE 3) and the fruit contacting members will move outwardly to their "extended" position shown in FIGURE 6.

After the fruit contacting members 20 are in this "extended" position, the operator then activates the power mechanism that rotates the fruit contacting members 20 about their longitudinal axis. Members 20 are perferably rotated in the directions indicated by the arrows in FIGURES 3 and 6 since it has been found that this arrangement causes the fruit 30 to turn or "spin" with the result that the stem becomes twisted to such an extent that it breaks and the fruit drops. (Members 20 should be rotated in a direction opposite to that shown in the drawings, or all members 20 could be rotated in the same direction.)

With members 20 rotating and in the extended position shown in FIGURE 6, the entire framework is slowly withdrawn from its "inserted" position in the tree. During the course of this withdrawal, the rotating fruit contacting members dislodge the fruit that it encounters and the fruit drops downwardly into bin 15.

In conclusion, while the foregoing specification and drawing describe the construction, operation and use of one preferred embodiment of the instant invention, it is to be understood that I do not intend to limit myself to the precise constructions and arrangements herein disclosed, since the various details of construction, form and arrangement may obviously be varied to a considerable extent by anyone skilled in the art without really departing from the basic principles and novel teachings of this invention, and without sacrificing any of the advantages of the invention, and accordingly it is intended to encompass all changes, variations, modifications and equivalents falling within the scope of the appended claims.

What is claimed is:

1. A fruit picking device comprising:
   (a) a framework that is disposed in a generally vertical plane,
   (b) a plurality of elongated and generally tubular foliage penetrating members mounted on said framework,
   (c) each of said elongated tubular foliage penetrating members housing at least one rotatable fruit contacting member,
   (d) each fruit contacting member being mounted so that it can be moved from a first position that is generally parallel to the longitudinal axis of the penetrating member to a second position that is at least partially outside of the housing of the foliage penetrating member, and which is at an angle to the longitudinal axis of the housing of the foliage penetrating member,
   (e) a first means for rotating each fruit contacting member, and
   (f) a second means for moving each fruit contacting member back and forth between said first and second positions.

2. A fruit picking device according to claim 1 wherein each penetrating member has a generally pointed forward end.

3. A fruit picking device according to claim 1 wherein each fruit contacting member is essentially cylindrical in shape.

4. A fruit picking device accordingly to claim 1 wherein each fruit contacting member is joined to a drive shaft by means of a flexible interconnection so that each fruit contacting member can be rotated while it is in both said first position and said second position.

5. A fruit picking device according to claim 1 wherein parallel vertical rows of rotatable fruit contacting members operate simultaneously and every member in any given vertical row rotates in the same direction.

6. A fruit picking device according to claim 1 wherein the fruit contacting members in each horizontal row all rotate in the same direction.

7. A fruit picking device according to claim 1 wherein adjacent fruit contacting members in a horizontal row rotate in opposite directions.

References Cited

UNITED STATES PATENTS

| | | | |
|---|---|---|---|
| 3,040,507 | 6/1962 | Lasswell | 56—328 |
| 3,077,720 | 2/1963 | Grove et al. | 56—328 |
| 3,143,844 | 8/1964 | Polk, Jr. | 56—328 |
| 3,380,235 | 4/1968 | Smith et al. | 56—328 |
| 3,417,558 | 12/1968 | Granger | 56—328 |

RUSSELL R. KINSEY, Primary Examiner

U.S. Cl. X.R.

56—328